United States Patent
Gard et al.

(10) Patent No.: US 9,562,400 B2
(45) Date of Patent: Feb. 7, 2017

(54) THREADED TUBULAR COMPONENT AND RESULTING CONNECTION

(75) Inventors: Eric Gard, Fontaines-sur-Saone (FR); Eliette Pinel, Sainte-Euphemie (FR); Mikael Petit, Villefranche-sur-Saone (FR); Mohamed Gouider, Caluire-et-Cuire (FR)

(73) Assignees: VALLOUREC OIL AND GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 11 days.

(21) Appl. No.: 13/824,812

(22) PCT Filed: Oct. 12, 2011

(86) PCT No.: PCT/EP2011/067767
§ 371 (c)(1),
(2), (4) Date: Mar. 18, 2013

(87) PCT Pub. No.: WO2012/049194
PCT Pub. Date: Apr. 19, 2012

(65) Prior Publication Data
US 2013/0193682 A1    Aug. 1, 2013

(30) Foreign Application Priority Data
Oct. 15, 2010 (FR) ...................................... 10 04071

(51) Int. Cl.
*B32B 1/08* (2006.01)
*E21B 17/042* (2006.01)
(Continued)

(52) U.S. Cl.
CPC ........... *E21B 17/042* (2013.01); *C09D 7/1216* (2013.01); *C10M 169/04* (2013.01);
(Continued)

(58) Field of Classification Search
CPC .......... B32B 1/02; B32B 1/08; Y10T 428/139; E21B 17/042; C09D 7/1216; C10N 2230/06; C10N 2250/08; C10N 2250/121
(Continued)

(56) References Cited

U.S. PATENT DOCUMENTS 4,178,465 A * 12/1979 Caporiccio et al. ....... 428/835.8
RE30,467 E    12/1980 House et al.
(Continued)

FOREIGN PATENT DOCUMENTS

CN    101535458 A    9/2009
FR    2 892 174        4/2007
(Continued)

OTHER PUBLICATIONS

U.S. Appl. No. 14/427,370, filed Mar. 11, 2015, Gouider, et al.
(Continued)

*Primary Examiner* — Marc A Patterson
(74) *Attorney, Agent, or Firm* — Oblon, McClelland, Maier & Neustadt, L.L.P.

(57) ABSTRACT

The invention concerns a threaded tubular component for drilling or working hydrocarbon wells, said tubular component having at one of its ends (1; 2) a threaded zone (3; 4) produced on its outer or inner peripheral surface depending on whether the threaded end is male or female in type, characterized in that at least a portion of the end (1; 2) is coated with a lubricating dry film (12) the matrix (13) of which comprises at least one migrating sliding agent (9) belonging to the oils or waxes family and principally distributed at the surface of the lubricating dry film (12) such that the coefficient of friction of the film (12) is less than 0.07 at loads of less than 40 N while the coefficient of friction of the film (12) is more than 0.1 at loads of more than 200 N.

17 Claims, 4 Drawing Sheets

(51) Int. Cl.
  *C09D 7/12* (2006.01)
  *C10M 169/04* (2006.01)
  *B32B 1/02* (2006.01)

(52) U.S. Cl.
  CPC . *C10M 2201/041* (2013.01); *C10M 2201/081* (2013.01); *C10M 2201/105* (2013.01); *C10M 2205/043* (2013.01); *C10M 2205/16* (2013.01); *C10M 2205/18* (2013.01); *C10M 2209/0845* (2013.01); *C10M 2209/1023* (2013.01); *C10M 2213/003* (2013.01); *C10M 2213/023* (2013.01); *C10M 2213/04* (2013.01); *C10M 2215/08* (2013.01); *C10M 2217/044* (2013.01); *C10M 2229/02* (2013.01); *C10M 2229/025* (2013.01); *C10M 2229/041* (2013.01); *C10N 2230/06* (2013.01); *C10N 2250/08* (2013.01); *C10N 2250/121* (2013.01)

(58) Field of Classification Search
  USPC .............. 428/34.1, 34.2, 35.7, 35.9, 36.9
  See application file for complete search history.

(56) References Cited

U.S. PATENT DOCUMENTS

| | | | |
|---|---|---|---|
| 4,419,137 A * | 12/1983 | Cayless | C09D 5/084 106/14.39 |
| 4,822,081 A | 4/1989 | Blose | |
| RE34,467 E | 12/1993 | Reeves | |
| 2006/0089276 A1 * | 4/2006 | Klotz | 508/464 |
| 2009/0220780 A1 | 9/2009 | Bordet et al. | |
| 2009/0264326 A1 * | 10/2009 | Imai | C10M 169/04 508/100 |
| 2010/0167968 A1 | 7/2010 | Pinel et al. | |
| 2012/0169048 A1 | 7/2012 | Pinel et al. | |
| 2012/0312527 A1 | 12/2012 | Pinel et al. | |
| 2013/0075083 A1 | 3/2013 | Gard et al. | |

FOREIGN PATENT DOCUMENTS

| | | |
|---|---|---|
| FR | 2 914 926 | 10/2008 |
| WO | WO 2006/113000 A2 | 10/2006 |
| WO | 2008/108266 A1 | 9/2008 |
| WO | WO 2009/057754 A1 | 5/2009 |
| WO | 2010/114168 A1 | 10/2010 |

OTHER PUBLICATIONS

International Search Report Issued Jan. 4, 2012 in PCT/EP11/67767 Filed Oct. 12, 2011.
U.S. Appl. No. 13/977,238, filed Sep. 4, 2013, Pinel, et al.
U.S. Appl. No. 14/316,351, filed Jun. 26, 2014, Bordet, et al.
U.S. Appl. No. 14/369,345, filed Jun. 27, 2014, Gard, et al.
U.S. Appl. No. 13/884,717, filed May 10, 2013, Gard, et al.
U.S. Appl. No. 14/348,711, filed Mar. 31, 2014, Gard, et al.

* cited by examiner

THREADED TUBULAR COMPONENT AND RESULTING CONNECTION

The present invention relates to a tubular element for drilling and/or working hydrocarbon wells, and more precisely to the threaded end of such an element. Said end may be male or female in type and capable of being connected to a corresponding end of an analogous element to form a connection.

The invention also relates to a threaded connection resulting from making up two tubular elements.

The term "tubular element for drilling and working hydrocarbon wells" means any element which is substantially tubular in form intended to be connected to another element of the same type or otherwise, in particular to constitute either a string for drilling a hydrocarbon well or a riser intended for maintenance (also known as a work-over riser) or for working such a well, such as a riser, or for a casing string or tubing string used in working wells. The invention is also applicable to elements used in a drill string, such as for example drill pipes, heavy weight drill pipes, drill collars and the portions of pipe connections and heavy weight pipes known as tool joints.

Each tubular element comprises an end portion provided with a male threaded zone or a female threaded zone each intended to be made up with a corresponding end portion of an analogous element. Connected in this manner, the elements compose what is termed a connection.

Said threaded tubular components of a connection are connected under defined loads in order to satisfy the requirements for an interference fit and seal imposed by the service conditions. Further, as is known, threaded tubular components may be required to undergo several makeup-breakout cycles, in particular in the wells.

The conditions for use of such threaded tubular components give rise to different types of stresses which make it necessary to use coatings on the sensitive portions of such components such as the threaded zones, abutting zones or sealing surfaces.

Thus, makeup operations are generally carried out under a high axial load, for example due to the weight of a tube several meters in length to be connected via the threaded connection, possibly localized by a slight misalignment of the axis of the threaded elements to be connected. This induces risks of galling at the threaded zones and/or at the metal/metal sealing surfaces. For this reason, the threaded zones as well as the metal/metal sealing surfaces are routinely coated with lubricants.

Furthermore, the threaded tubular components are stored then made up in a hostile environment. This is the case, for example, in an offshore situation in the presence of a saline mist or in an onshore situation in the presence of sand, dust and/or other pollutants. Thus, it is necessary to employ coatings that counter corrosion on the surfaces which have to cooperate by makeup (threaded zones) or by interfering contact (metal/metal sealing surfaces). It is also necessary to treat the surfaces against corrosion.

Environmentally, however, it appears that using makeup greases conforming to API (American Petroleum Institute) standard RP 5A3 does not constitute a long-term solution because such greases can be expelled from the tubular components and be released into the environment or into the well, resulting in plugging which necessitates special cleaning operations.

In order to overcome the problems of requiring long-term corrosion resistance and resistance to galling and to satisfy environmental prerogatives, solid dry coatings (i.e. not pasty, unlike greases), lubricants and protectors have been developed. This is the case in particular with coatings comprising a thermoplastic matrix with viscoplastic characteristics charged with particles of solid lubricant. Such coatings have in particular been able to overcome problems with successive makeup and breakout, especially under on-site conditions, as well as problems with protecting the threaded elements against corrosion.

However, it has been observed that under service conditions, there is so much lubricant that an interference fit between the male and female ends of a threaded tubular connection that conforms to the predetermined makeup torque profile for that threaded tubular connection is no longer possible. In other words, such coatings reduce friction on the makeup abutment at the end of makeup under extreme Hertz stresses known as "extreme pressure" and at low frictional speed that the plastification torque is reached much sooner. This results in much lower torque on shoulder resistance values than the reference values which are obtained using API RP 5A3 grease. For this reason, in certain extreme cases, the abutment is plasticized before the useful makeup torque is reached.

The Applicant thus sought to solve the dichotomy which exists between a high torque on shoulder resistance value (difference between the plastification torque and the shouldering torque) with a low shouldering torque and sufficient galling resistance.

The invention proposes a threaded tubular component for drilling or working hydrocarbon wells, said tubular component having in the vicinity of one of its ends a threaded zone produced on its outer or inner peripheral surface depending on whether the threaded end is male or female in type, which is remarkable in that at least a portion of the end is coated with a lubricating dry film the matrix of which may comprise at least one migrating sliding agent belonging to the oil or wax family principally distributed on the surface of the lubricating dry film such that the coefficient of friction of the film is less than 0.07 at loads of less than 40 N while the coefficient of friction of the film is more than 0.1 at loads of more than 200 N.

In other words, which are substantially equivalent, the invention proposes a tubular element for drilling and/or working hydrocarbon wells, having an end portion comprising at least one threaded zone which is remarkable in that the end portion is at least partially coated with a dry film which comprises a matrix and at least one migrating sliding agent in the matrix principally distributed in the vicinity of the free surface of the lubricating dry film, in that said sliding agent is selected from oils and waxes, and in that the matrix and said sliding agent are jointly adapted such that the dry film has a coefficient of friction of less than 0.07 at loads of less than 40 N and more than 0.1 at loads of more than 200 N.

The present invention proposes using migrating sliding agents to preferentially form, at the surface of the coated portion of the threaded element, a lubricating dry film in order to reduce the friction and adhesion of said film as regards other surfaces, said migrating sliding agents, however, allowing a torque on shoulder resistance at least equal to that obtained when the threaded elements are coated with an API RP 5A3 standard grease to be conserved.

In particular, the present invention concerns the use of migrating sliding agents in a thermoplastic or thermoset matrix that can produce low coefficients of friction when the surface of the coated portion of the threaded element is subjected to low pressure shear stresses during the start of makeup, and higher coefficients of friction when the surface of the coated portion of the threaded element is subjected to extreme pressure shear stresses on approaching the end of makeup.

Optional characteristics, either complementary or substitutional, are defined below.

The migrating sliding agent may comprise a silicone oil and/or a perfluorinated oil.

The migrating sliding agent may comprise a polydimethylsiloxane type silicone oil with a surface tension of <24 mN/m and a kinematic viscosity in the range 100 to 1850 mm$^2$/s at 20° C.

The migrating sliding agent may comprise an amide wax and/or a paraffin wax.

The migrating sliding agent may comprise a saturated or unsaturated primary amide wax of the erucamide, oleamide or stearamide type and/or a saturated or unsaturated secondary amide wax of the ethylene bis-oleamide or ethylene bis-stearamide type, and/or a paraffin wax.

The lubricating dry film may comprise a thermoset or thermoplastic matrix selected so as to provide the lubricating dry film with a torque on shoulder resistance value at least equal to that obtained with an API RP 5A3 grease.

The lubricating dry film may comprise a fluoro-urethane matrix obtained by curing fluoroethylenevinylether in aqueous dispersion.

The lubricating dry film may comprise a thermoplastic matrix obtained from polyester-acrylate copolymers or styrene-acrylic copolymers in aqueous dispersion.

The lubricating dry film may comprise a projected hot melt thermoplastic matrix selected so as to provide the lubricating dry film with a torque on shoulder resistance value at least equal to that obtained with an API RP 5A3 grease.

The lubricating dry film may comprise a copolyamide matrix.

The lubricating dry film may comprise in the range 5% to 10% by weight of polydimethylsiloxane oil, the matrix being a copolyamide matrix.

The lubricating dry film may comprise polydimethylsiloxane oil with a molecular mass in the range 10000 to 40000 g/mol and with a kinematic viscosity of 1000 mm$^2$/s or less at 25° C.

The migrating sliding agent may comprise a perfluoropolyether with a kinematic viscosity in the range 150 to 1850 mm$^2$/s or functionalized alkylamide or phosphate with a molecular mass in the range 1850 to 3100 g/mol.

The lubricating dry film may comprise substantially 2% by weight of polydimethylsiloxane oil, the matrix being a fluoro-urethane matrix.

The lubricating dry film may comprise particles of lubricants from classes 1, 2, 3 or 4, preferably carbon fluorides and/or synthetic graphites.

The lubricating dry film may comprise an anti-corrosion agent, preferably an ion exchange silica.

The coated portion of the lubricating dry film may have initially received a surface preparation step selected from the group constituted by sandblasting, conversion treatments, electrolytic deposition and non-reactive treatments.

The entire threaded zone is coated with lubricating dry film.

The threaded tubular component may comprise a metal/metal sealing surface, said sealing surface being coated with lubricating dry film.

The invention also concerns a threaded tubular connection comprising a male threaded tubular component and a female threaded tubular component made up one into the other, a portion of at least one of said threaded tubular components being coated with lubricating dry film.

The features and advantages of the invention will be described in more detail in the description which follows, made with reference to the accompanying drawings.

Figure 1:
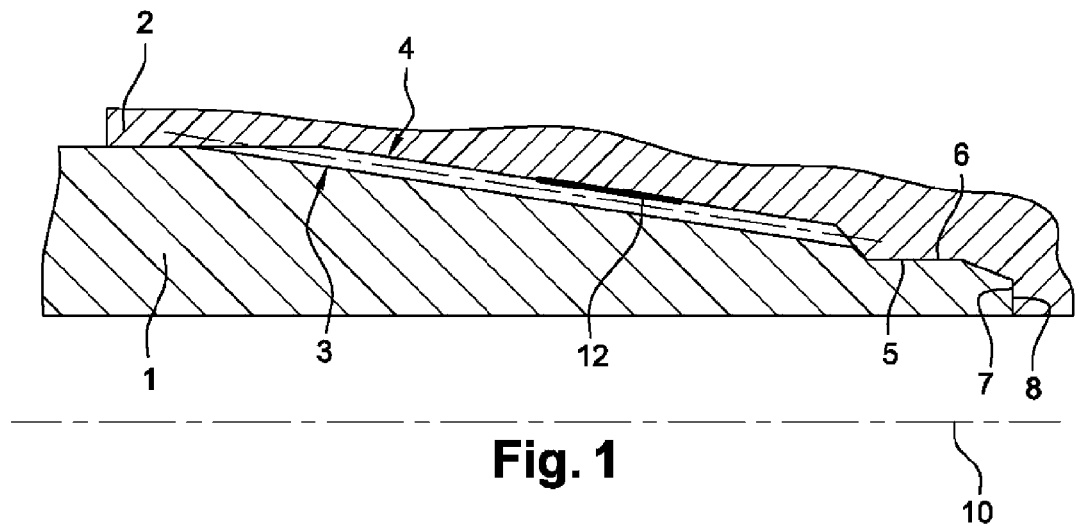
FIG. 1 is a diagrammatic view of a connection resulting from connecting two tubular components by makeup.

The threaded connection shown in FIG. 1 comprises a first tubular component with an axis of revolution 10 provided with a male end portion 1 and a second tubular component with an axis of revolution 10 provided with a female end portion 2. The two end portions 1 and 2 each have a terminal surface which is orientated perpendicular to their respective axis of revolution 10 and are respectively provided with a threaded zone 3 and 4 which cooperate mutually for mutual connection of the two components by makeup. The threaded zones 3 and 4 may be of the trapezoidal, self-locking, or other thread type. Furthermore, metal/metal sealing surfaces 5, 6 intended to come into sealed interference contact against each other after connecting the two threaded components by makeup are provided respectively on the male 1 and female 2 end portions close to the threaded zones 3, 4. The male end portion 1 has a terminal surface 7 which comes into abutment against a corresponding surface 8 provided on the female end portion 2 when the two components are made up one into the other.

In another embodiment, the abutment between the terminal surface 7 and the corresponding surface 8 may be replaced by threaded zones 3, 4 arranged to cooperate by self-locking interference of the type described, for example, in U.S. Pat. No. 4,822,081, US RE 30 467 and US RE 34467.

Figure 3:
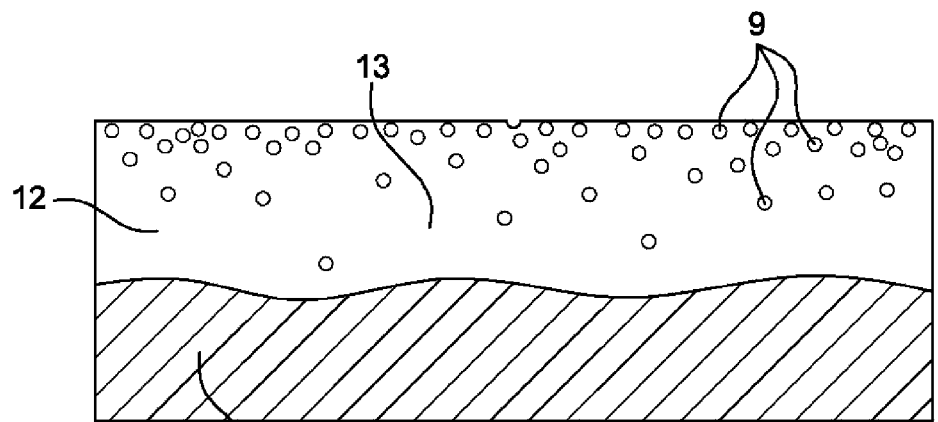
FIG. 3 is a diagrammatic view of a substrate coated with a lubricating dry film.

As can be seen in FIGS. 1 and 3, the end portion 1 or 2 of at least one of the tubular components is at least partially coated with a lubricating dry film 12 comprising a matrix 13 and at least one migrating sliding agent 9 therein selected from oils and waxes. This agent is principally distributed in the vicinity of the surface of the lubricating dry film 12, i.e. that opposite to the outer surface of the end portion or substrate 11.

A dry film is a solid film which is not tacky to the touch.

The term "oils" means a liquid, unctuous fat of vegetable, animal, mineral or synthetic origin. The term "wax" means a malleable, fusible material, in particular of vegetable, oil or synthesized origin.

The migrating sliding agent 9 here is concentrated to 65% by weight in the upper 15 microns of the thickness of the film 12. In other words, at least 65% by weight of the sliding agent included in the matrix 3 is distributed in an upper layer of the film 12 of approximately 15 microns. This distribution derives benefit from the migratory phenomenon occurring during deposition of the film 12 on the substrate 11. The phenomenon of migration of agents is known in the packaging field where it constitutes a toxicological risk (leaching), from the tendency of a migrating oil to generate elastohydrodynamic films in the lubricating contact (M Marchetti, Thesis, INSA 2000) or in the field of the interaction between lubricants and rubbers with swelling/shrinkage by migration of oil into the seals, for example.

Preferably, the migrating sliding agent is selected from polydimethylsiloxanes, perfluoropolyethers, amide waxes and paraffin waxes.

The lubricating dry film 12 may cover all or a portion of the threaded zone 3, 4.

The lubricating dry film 12 may cover all or a portion of the metal/metal sealing surface 5, 6.

The lubricating dry film 12 may also not cover the sealing surface 5, 6 and/or the threaded zone 3, 4.

The dry film 12 has low surface friction. This results in low resistance to shear at low loads.

The matrixes used may be thermoplastic or thermoset in type. The phenomenon of surface migration of the migrating sliding agent is linked to the kinetics of dry film formation.

In the case of a thermoplastic matrix deposited by a hot melt projection method, the film formation kinetics are substantially the kinetics of cooling of the projected thermoplastic material.

In the case of a thermoset matrix, the film formation kinetics are substantially the kinetics of curing of the thermoset material.

For this reason, the migrating sliding agents used must at least partially comply with the following requirements: density or mass per unit volume lower than that of the combined constituents of the matrix, relatively low molecular mass, and low chemical and physical interaction capacity with the constituents of the matrix.

Several migrating sliding agents satisfying these criteria were tested, such as carnauba waxes, paraffin waxes, polyethylene waxes, and primary and secondary amide waxes, for example.

Of these agents, those which are recommended provide the film 12 with a type of viscoelastic behavior under shear known as "rheoresistant", i.e. with which a high torque on shoulder resistance is obtained at the end of makeup. In particular, these are perfluoropolyethers and modified or non-modified polydimethylsiloxane type silicone oils.

It has been shown that the dry films 12 including such migrating sliding agents have a "self-lubricating" character insofar as these agents are liberated at the surface of the film when abrasion of the film occurs under friction.

More particularly, the following migrating sliding agents were studied: linear polydimethylsiloxanes with a viscosity in the range 100 to 12500 $mm^2/s$ at 25° C., polyether-modified short chain length non-ionic linear polydimethylsiloxane emulsions, anionic emulsions of short chain length, amine or hydroxysilane functionalized polydimethylsiloxanes, perfluoropolyethers with a kinematic viscosity in the range 150 to 1850 $mm^2/s$, or alkylamide or phosphate-functionalized with a molecular mass in the range 1850 to 3100 g/mol, saturated or unsaturated primary amide waxes of the erucamide, oleamide and stearamide type, saturated or unsaturated secondary amide waxes of the ethylene bis-oleamide and ethylene bis-stearamide type, and emulsions of paraffin waxes or of secondary amide waxes of the ethylene bis-stearamide type.

Films were tested which comprised, as migrating sliding agents, polydimethylsiloxane type silicone oils of different grades in terms of molecular mass sold under the trade name Wacker Fluid AK by Wacker and under the trade name Rhodorsil Fluid by the supplier Bluestar.

Amide waxes sold by Croda under the trade name Crodamide were also tested, as well as perfluoropolyethers sold by the supplier Sovay Solexis under the trade name Fluorolink or Fomblin.

For the matrix, hot melt projected thermoplastics such as co polyamide resins or thermoset compounds in aqueous dispersion of the styrene-acrylic copolymer type, polyurethane and fluoro-urethane modified acrylic type were selected.

Thermoplastic matrixes have a type of viscoelastic behavior under shear termed "rheoresistant", i.e. they provide a high torque on shoulder resistance value at the end of makeup, while thermoset matrixes have a relatively high level of adhesion on carbon steel substrates with or without surface treatment.

The substrate 11, constituted by the coated portion of the threaded element, here formed from carbon steel, initially received surface treatments consisting of a 10 μm electrolytic deposit of Cu—Sn—Zn (see, for example, WO 2008/108266). Such preparation treatments are optional, however, and/or may take other forms such as a mechanical sand-blasting type treatment or a phosphatation type conversion treatment.

The thickness of the films studied was in the range 20 to 45 μm.

The films with a thermoplastic matrix were obtained using a film applicator or using hot melt projection technology, while the films with a thermoplastic or thermoset matrix in aqueous dispersion were applied using a conventional pneumatic gun and cup with a 1.7 mm diameter nozzle.

The tests consist of evaluating a certain number of parameters, in particular:
- the frictional torque at the surfaces in contact under high Hertz stresses (Bridgman test);
- the adhesive force and the coefficient of friction of the film on the substrate (Scratch test);
- the resistance with temperature of the film to a polluting environment.

The Bridgman test can determine the tribological characteristics of dry films during a makeup operation specific for "premium" connections. More precisely, the torque on shoulder resistance (CSB), also known as the ToSR (torque on shoulder resistance), is simulated and determined. This torque arises during makeup operations specific for premium connections used in the oil industry.

Figure 2:
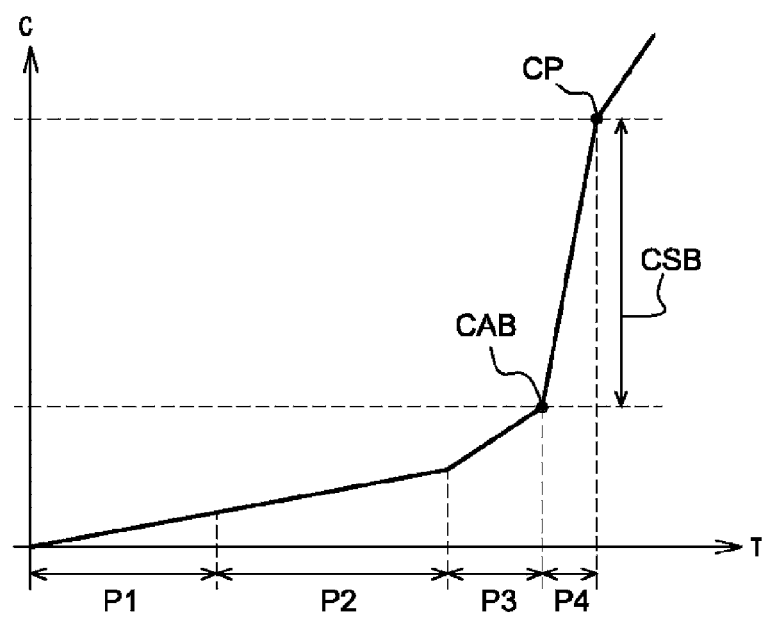
FIG. 2 is a diagrammatic view of a makeup curve for two threaded tubular components.

The curve in FIG. 2 expresses the makeup (or clamping) torque as a function of the number of rotational turns made. As can be seen, a profile for the makeup torque of "premium" connections can be broken down into four portions.

During a first portion P1, the external threads of the male threaded element (or pin) of a first component of a threaded tubular connection as yet have no radial interference with the internal threads of the corresponding female threaded element (or box) of a second component of the same threaded tubular connection.

During a second portion P2, the geometrical interference of the threads of the male and female threaded elements generates a radial interference which increases as makeup continues (generating a small but increasing makeup torque).

During a third portion P3, a sealing surface at the external periphery of the end portion of the male threaded element interferes radially with a corresponding sealing surface of the female threaded element to produce a metal/metal seal.

During a fourth portion P4, the front end surface of the male threaded element is in axial abutment with the annular surface of a makeup abutment of the female threaded element. This fourth portion P4 corresponds to the terminal phase of makeup.

The makeup torque which corresponds to the end of the third portion P3 and to the start of the fourth portion P4 is termed the shouldering torque (CAB).

The makeup torque which corresponds to the end of the fourth portion P4 is termed the plastification torque (CP). Beyond this plastification torque CP, it is assumed that the male makeup abutment (end portion of the male threaded element) and/or the female makeup abutment (zone located behind the annular abutment surface of the female threaded element) is subjected to plastic deformation, which may degrade performance as regards the tightness of the contact between the sealing surfaces by plastification of the sealing surfaces as well.

The difference between the values for the plastification torque CP and the shouldering torque CAB is termed the torque on shoulder resistance CSB (CSB=CP−CAB). A threaded tubular connection is subjected to an optimum interference fit at the end of makeup, which guarantees optimum mechanical strength of the threaded connection, for example as regards tensile forces, but also as regards accidental break-out in service, and for optimum sealing performances.

The designer of a threaded connection is thus obliged to define, for a given type of threaded connection, a value for the optimum makeup torque which, for all connections of this type of connection, must be lower than the plastification torque CP (in order to avoid plastification of the abutments and the concomitant disadvantages) and be higher than the shouldering torque, CAB. Ending makeup with a torque which is less than CAB means that correct relative positioning of the male and female elements and thus of an effective interference fit between their sealing surfaces cannot be guaranteed. Furthermore, there is a risk of break-out. The effective value of the shouldering torque CAB can fluctuate from one connection to another for the same type of connection as it depends on the diametral and axial machining tolerances of the male and female threads and sealing surface(s). The optimal makeup torque should be substantially higher than the shouldering torque CAB.

The higher the value of the torque on shoulder resistance CSB, the larger the margin for defining the optimized makeup torque, and the more the threaded connection will be resistant to operational stresses.

Figure 5:
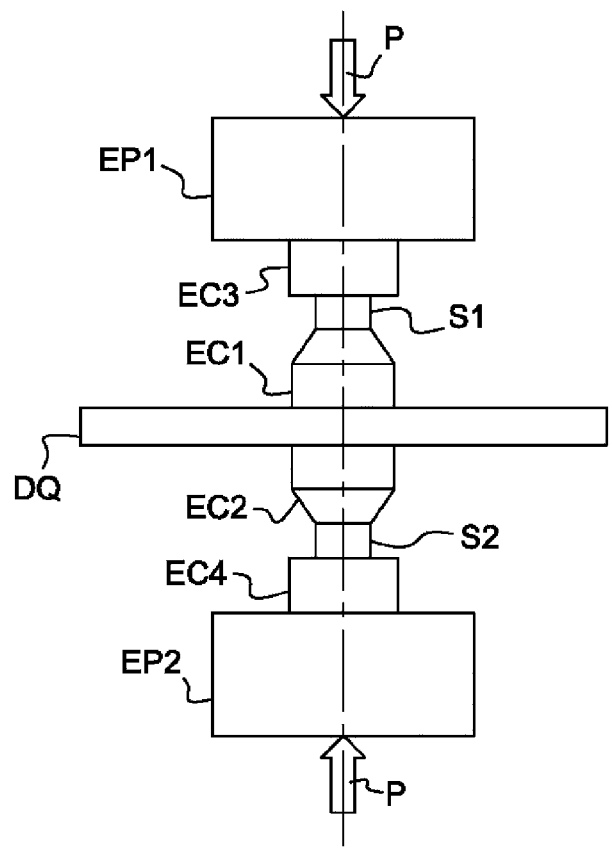
FIG. 5 is a diagrammatic view of another test set-up.

Friction tests were carried out using a Bridgman type machine. This type of machine has in particular been described in the article by D Kuhlmann-Wilsdorf et al, "Plastic flow between Bridgman anvils under high pressures", J. Mater. Res., vol 6, no 12, December 1991. A diagrammatic and functional example of a Bridgman machine is illustrated in FIG. 5.

This machine comprises: a disk DQ which can be driven in rotation at selected speeds; a first anvil EC1, preferably conical in type, permanently attached to a first face of the disk DQ; a second anvil EC2, preferably conical in type, permanently attached to a second face of the disk DQ, opposite its first face; first EP1 and second EP2 pressure elements, such as pistons, for example, which can exert the selected axial pressures P; a third anvil EC3, preferably cylindrical in type, which is permanently attached to one face of the first pressure element EP1; a fourth anvil EC4, preferably cylindrical in type, which is permanently attached to one face of the second pressure element EP2.

To test a lubricant composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1 GPa) with each of the first EP1 and second EP2 pressure elements, and the makeup torque to which each specimen S1, S2 is subjected is measured. The axial pressure, the rotation speed and the angle of rotation are selected in the Bridgman test in order to simulate the Hertz pressure and the relative speed of the abutment surfaces at the end of makeup. Using such a machine, it is possible to fix several different pairings of parameters (makeup torque, rotation speed) in order to impose predetermined makeup torques on specimens S1 and S2, and thus to check whether these specimens S1 and S2 closely follow a given makeup torque profile, and in particular whether they can reach a number of completed turns before galling which is at least equal to a threshold value selected with respect to the selected makeup torques.

In the present case, the contact pressure was raised to 1 GPa and the rotation speed was raised to 1 rpm. The test specimens were formed from stainless steel containing 13% Cr, machined then coated with the various dry film formulations listed in the table below with the determination of the torque on shoulder resistance (ToSR or CSB).

Figure 4:
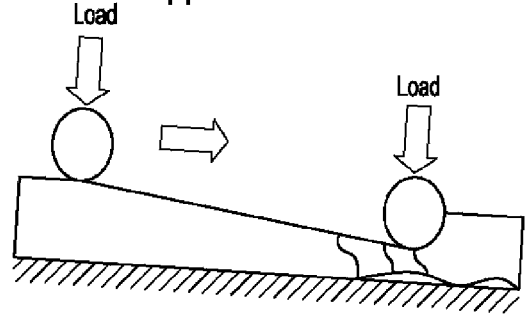
FIG. 4 is a diagrammatic view of a test set-up.

The Scratch test, shown diagrammatically in FIG. 4, allows the adhesive force or adhesion of a film on a surface or surface preparation to be determined. This method, consisting of shearing and deforming a film with a spherical bead subjected to an increasing load, also allows two major tribological parameters to be determined, namely the coefficient of friction and the critical load corresponding to the appearance of a loss of film cohesion.

The experimental conditions employ a spherical indenter formed from Inconel 718 with a diameter of 5 mm and a metal specimen as described above, using the following parameters: a load increasing from 10 N to 310 N (at a load increase rate of 15 N/s), a bead displacement rate of 2 mm/s, a period of 20 s and a track length of 40 mm).

The measured coefficient of friction is low and in the range $\mu=0.05$ for a load of 5 N and $\mu=0.09$ for a load of 80 N; in particular, a measurement of $\mu$ of 0.06 was obtained for a load of 80 N on a surface preparation of the electrolytic Cu—Sn—Zn deposit type. It is necessary to clearly set out the load and operating conditions of the test for each type of coating: for a hot melt type thermoplastic coating, the frictional value is measured for an increasing load from 10 to 310 N, while for a thermoset coating, the frictional value is measured for an increasing load from 250 to 750 N.

The tests on the resistance with temperature of the film as regards a polluting environment consisted of evaluating the adhesion of pollutants such as sand when the ambient temperature increased. More precisely, it concerned identifying the ambient temperature beyond which the film could no longer be decontaminated using compressed air. This allowed a determination of whether the film could be used in "hot" desert regions. The experimental conditions used XC carbon steel substrates which had received a zinc phosphatation or Cu—Sn—Zn electrolytic deposit type surface preparation.

The substrates were coated with a film thickness in the range 30 to 40 μm. Afterwards, a layer of foundry sand (d=1.36) was applied over at least 60 cm² of substrate.

Next, the sand-covered substrate was heated in a ventilated oven to the desired temperature for 1 hour (T° C.=50° C. minimum, 93° C. maximum).

Next, the substrate was cleaned off using compressed air, still at the test temperature.

Finally, the residual quantity of sand was measured.

The acceptance criterion was a maximum of 0.5% residual sand. In other words, 99.5% of the sand had to have been removed.

Initially, we aimed to identify the performances of migrating sliding agents in thermoplastic matrixes deposited by hot melt projection. The thermoplastic matrixes selected were of the copolyamide type based on an acid dimer as they had the best adhesion to their substrate and offered better temperature resistance. The majority of the other thermoplastic matrixes sometimes had weaker adhesion when the film was deposited on a substrate which had received an electrolytic surface preparation treatment. They might also not have been dry to the touch at the maximum service temperatures in the range 50° C. to 93° C. (lower softening temperature than the maximum temperatures). Finally, they might also have had a torque on shoulder resistance value below the reference threshold value for API grease.

We aimed to identify the effect of "polydimethylsiloxane oil" (PDMS) type migrating sliding agents on the torque on shoulder resistance values. Results relative to other migrating sliding agents are compared in Table 1.

TABLE 2

| Product name | Chemical nature | Ref (%) | Spec A (%) | Spec B (%) | Spec C (%) |
|---|---|---|---|---|---|
| Thermelt 105 | Pure copolyamide resin (Tg = +23° C.) | 100 | 95 | 90 | 80 |
| Rhodorsil 47V1000 | PDMS (1000 mm²/s at 25° C.) | — | 5 | 10 | 20 |
| Bridgman ToSR | ToSR: | 114% | 137% | 131% | 136% |

Table 2 shows that increasing the concentration of polydimethylsiloxane does not increase the torque on shoulder resistance value.

Next, the influence of the concentration of sliding agent, in particular polydimethylsiloxane type oil, on the resistance of the film to temperature was studied, in particular by a plasticizing effect and reduction in the softening point. The temperature resistance was determined using a test for the resistance to a polluting environment with temperature. It

TABLE 1

| Product name | Chemical nature | Ref (%) | Spec A (%) | Spec B (%) | Spec C (%) | Spec D (%) | Spec E (%) | Spec F (%) | Spec G (%) | Spec H (%) | Spec I (%) |
|---|---|---|---|---|---|---|---|---|---|---|---|
| Thermelt 105 matrix | Pure copolyamide resin (Tg = +23° C.) | 100 | 95 | 95 | 95 | 95 | 95 | 95 | 95 | 95 | 95 |
| SP19 | Microcrystalline wax | | 5 | | | | | | | | |
| Superslip 6515 | Mixture of PE/EBS waxes | | | 5 | | | | | | | |
| Crodamide ER | Erucamide wax | | | | 5 | | | | | | |
| Crodamide SR | Stearamide wax | | | | | 5 | | | | | |
| Crodamide EBO | Ethylene bis-oleamide | | | | | | 5 | | | | |
| Crodamide EBS | Ethylene bis-stearamide | | | | | | | 5 | | | |
| Rhodorsil 47V1000 | PDMS (1000 mm²/s, 25° C.) | | | | | | | | 5 | | |
| Elevast R170 | Hydrocarbon oil, no phthalates (70 mm²/s, 40° C.) | | | | | | | | | 5 | |
| Fomblin YR1500 | Perfluoropolyether (1500 mm²/s, 25° C.) | | | | | | | | | | 5 |
| Bridgman ToSR | ToSR: | 114% | 31% | 59% | 27% | 62% | 105% | 116% | 137% | 102% | 131% |

Table 1 shows that the oils, in comparison with the waxes, have little or no effect on the torque on shoulder resistance value. The silicone and perfluorinated oils (of the polydimethylsiloxane and perfluoropolyether type) improve the value of the torque on shoulder resistance by developing viscoelastic characteristics in the thermoplastic matrix.

Primary amide waxes, in particular unsaturated primary amide waxes (Crodamide ER) have a purely viscoplastic rheological behavior under shear. Secondary amide waxes develop viscoelastic characteristics which improve the torque on shoulder resistance value. This can be explained by the unsaturated structure offering low resistance to shear during friction.

Next, the influence of the concentration of sliding agent, in particular polydimethylsiloxane type oil, on the torque on shoulder resistance value was studied. The results are shown in Table 2.

can be seen from Table 3 that the temperature resistance remained unchanged for an oil concentration in the range 5% to 10%.

TABLE 3

| Product name | Chemical nature | Ref (%) | Spec A (%) | Spec B (%) | Spec C (%) |
|---|---|---|---|---|---|
| Thermelt 105 | Pure copolyamide resin (Tg = +23° C.) | 100 | 95 | 90 | 80 |
| Rhodorsil 47V1000 | PDMS (1000 mm²/s at 25° C.) | — | 5 | 10 | 20 |
| Temperature resistance (93° C.) | Sand residue after decontamination | 0.64% | 0.69% | 0.79% | 3.45% |

The coefficients of friction (COF) of the secondary amide waxes and the preferably siliconized oils are evaluated in Tables 4 and 5 for a thermoplastic matrix comprising at least one acid dimer based copolyamide.

TABLE 4

| Product name | Chemical nature | Ref A (%) | Ref B (%) | Spec A (%) | Spec B (%) |
|---|---|---|---|---|---|
| Thermelt 105 | Pure copolyamide resin (Tg = +23° C.) | 100 | | 95 | |
| Thermelt 200 | Pure copolyamide resin (Tg = −26° C.) | | 100 | | 95 |
| Rhodorsil 47V1000 | PDMS (1000 mm$^2$/s at 25° C.) | — | — | 5 | 5 |
| Scratch test | Mean COF, 5-80N: | 0.296 | 0.206 | 0.121 | 0.063 |
| Scratch test | Mean COF, 10-310N: | 0.230 | 0.169 | 0.099 | 0.104 |

TABLE 5

| Product name | Chemical nature | Ref (%) | Spec A (%) | Spec B (%) |
|---|---|---|---|---|
| Thermelt 200 | Pure copolyamide resin (Tg = −26° C.) | 100 | 90 | 85.5 |
| Waxso N | Ethylene bis-stearamide | | 10 | 9.5 |
| Rhodorsil 47V1000 | PDMS (1000 mm$^2$/s at 25° C.) | | | 5 |
| Scratch test | Mean COF, 5-80N: | 0.206 | 0.102 | 0.035 |
| Scratch test | Mean COF, 10-310N: | 0.169 | 0.125 | 0.084 |
| Bridgman ToSR | ToSR: | 147% | 108% | 104% |

The synergistic effect between a secondary amide wax and the polydimethylsiloxane oil means that a very low coefficient of friction can be produced, of the order of 0.03-0.04 under low contact pressures and 0.08 for extreme contact pressures of up to 1.1 GPa.

Figure 6:
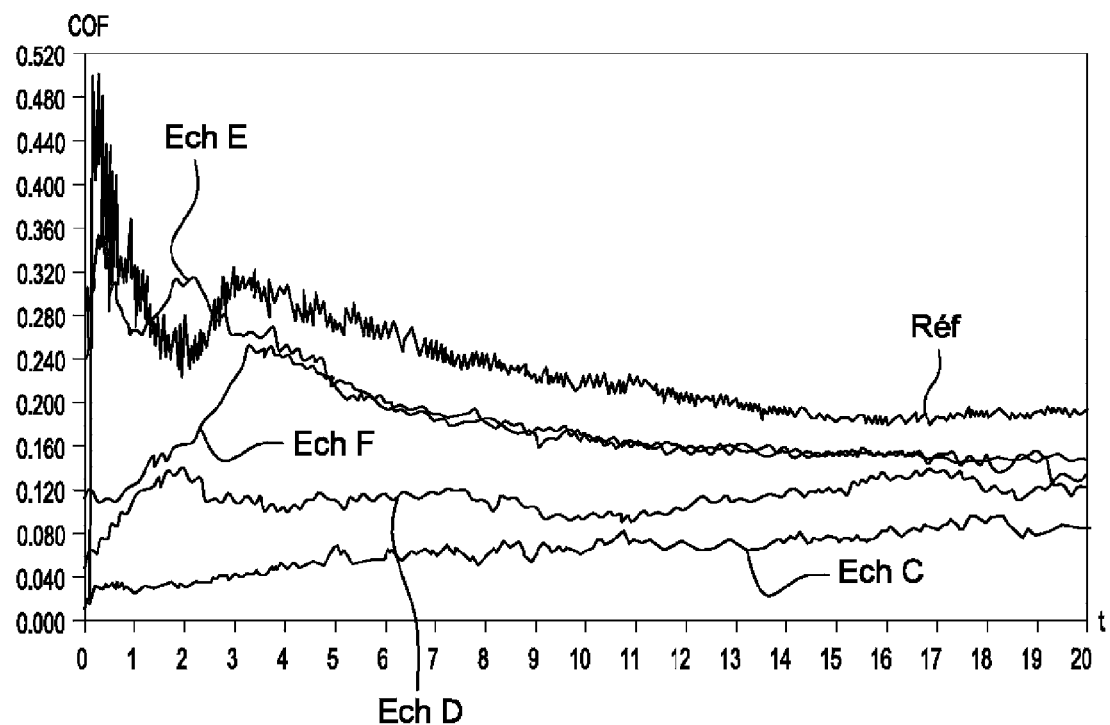
FIGS. 6 to 8 show test curves.

The coefficients of friction were measured for a wide range of amide waxes (shown in Table 1) in a copolyamide thermoplastic matrix (Thermelt 105). The results are shown in FIG. 6, which shows the change in the coefficient of friction as a function of time for an increasing load from 10 to 310N. Erucamide wax had the most stable and lowest coefficient of friction (COF) in the range 0.04 to 0.08 for contact pressures in the range 250 MPa to 1.1 GPa (contact pressures determined using the Young's modulus for the surface preparation and that of the film for low loads). This confirms the first results of Table 1.

Great demands on the torque on shoulder resistance values and/or certain applications may require the use of saturated or unsaturated secondary amide waxes.

The impact of concentration and molecular mass of the polydimethylsiloxane oils in the thermoplastic matrixes was studied.

Table 6 presents the variations in concentrations of polydimethylsiloxane oil in a copolyamide thermoplastic matrix with a secondary amide wax.

TABLE 6

| Product name | Chemical nature | Ref (%) | Spec A (%) | Spec B (%) | Spec C (%) |
|---|---|---|---|---|---|
| Thermelt 200 | Pure copolyamide resin (Tg = −26° C.) | 90 | 89.5 | 86.5 | 85.5 |
| Waxso N | Ethylene bis-stearamide | 10 | 9.5 | 9.5 | 9.5 |
| Rhodorsil 47V1000 | PDMS (1000 mm$^2$/s at 25° C.) | — | 1 | 3 | 5 |
| Scratch test | Mean COF, 5-80N: | 0.102 | 0.077 | 0.075 | 0.035 |
| Scratch test | Mean COF, 10-310N: | 0.125 | 0.105 | 0.108 | 0.084 |

In order to obtain a very low surface friction, a minimum concentration of 5% of polydimethylsiloxane oil had to be used.

Table 7 presents the values for the coefficient of friction (COF) for a polydimethylsiloxane oil with different molecular weights.

TABLE 7

| Product name | Chemical nature | Ref (%) | Spec A (%) | Spec B (%) | Spec C (%) |
|---|---|---|---|---|---|
| Thermelt 200 | Pure copolyamide resin (Tg = −26° C.) | 90 | 85.5 | 86.5 | 85.5 |
| Waxso N | Ethylene bis-stearamide | 10 | 9.5 | 9.5 | 9.5 |
| Rhodorsil 47V100 | PDMS (100 mm$^2$/s at 25° C.) | — | 5 | | |
| Rhodorsil 47V1000 | PDMS (1000 mm$^2$/s at 25° C.) | — | | 5 | |
| Wacker AK 12500 | PDMS (12500 mm$^2$/s at 25° C.) | — | | | 5 |
| Scratch test | Mean COF, 5-80N: | 0.102 | 0.053 | 0.035 | 0.068 |
| Scratch test | Mean COF, 10-310N: | 0.125 | 0.086 | 0.084 | 0.103 |

It appears to be advantageous to use a polydimethylsiloxane type oil with a viscosity in the range 100 to 1000 mm$^2$/s at 25° C. Beyond this and for higher viscosities, the migration effect is partial, however. A scanning electron microscope study of a dry film with a thermoplastic matrix based on copolyamide resin demonstrates this partial migration effect. A polydimethylsiloxane type oil with a viscosity of 1000 mm$^2$/s (i.e. with a low molecular weight) is concentrated by the migratory effect during cooling of the film with a thermoplastic matrix deposited using hot melt technology, mainly into the 5 microns closest to the film surface. The presence of polydimethylsiloxane type oil is, in contrast, minor at the interface of the film and substrate.

In contrast, a polydimethylsiloxane type oil with a viscosity of 12500 mm$^2$/s (i.e. with a high molecular mass) is concentrated by the migratory effect during cooling of the thermoplastic matrix film deposited using hot melt technology mainly in the 20 to 25 μm closest to the film surface. The presence of polydimethylsiloxane type oil is also of minor importance to the film interface.

A concentration gradient of the silicone oil in the film thus modifies the value of the coefficient of friction of the film under load.

Figure 7:
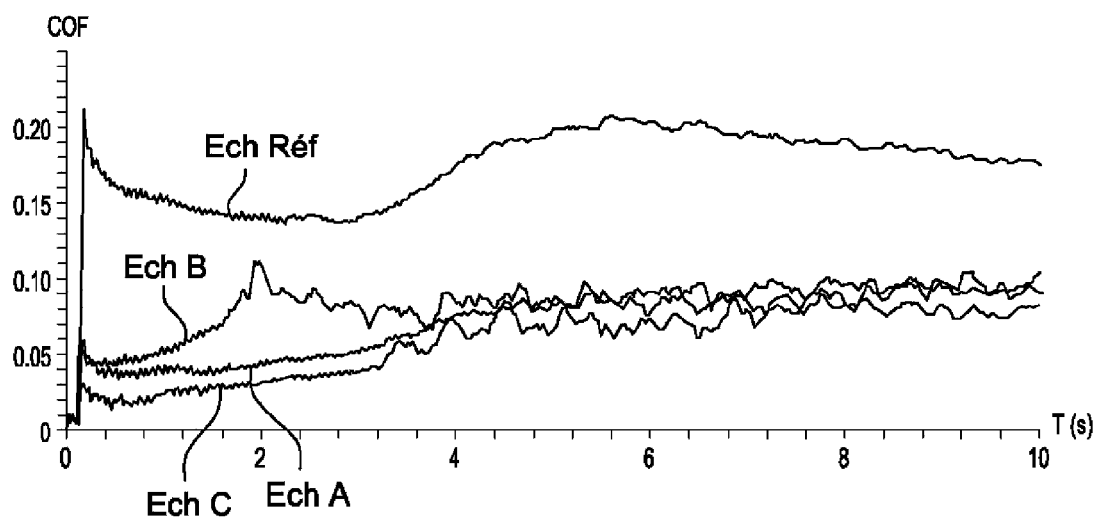

Table 8 shows the compositions for which the coefficient of friction was measured for the curves of FIG. 7 as a function of a ramp-up of load from 10 to 310 N.

Figure 8:
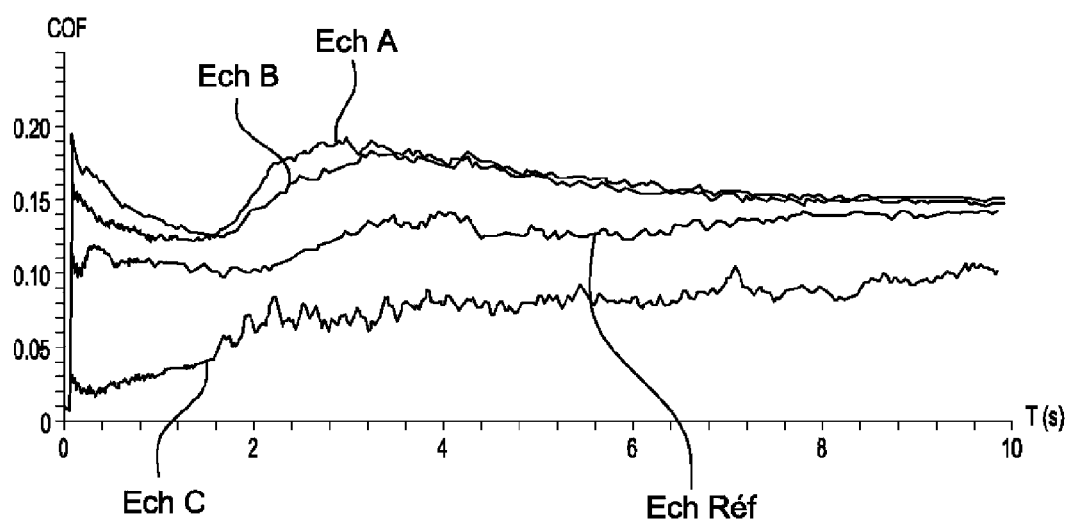

Table 9 shows other compositions for which the coefficient of friction have been measured on the curves of FIG. 8 as a function of a ramp-up of load from 10 to 310 N.

These curves show the greater beneficial influence of migrating silicone oil in reducing the value of the coefficient of friction compared with migrating waxes of an ethylene bis-stearamide chemical nature, and also the synergistic effects with solid lubricants from class 1, 2 or 4.

The term "solid lubricant" as used here means a solid and stable body which, on being interposed between two frictional surfaces, reduces the coefficient of friction and reduces wear and damage to the surfaces. Solid lubricants can be classified into different categories defined by their functional mechanism and their structure, namely:

class 1: solid bodies owing their lubricating properties to their crystalline structure, for example graphite, zinc oxide (ZnO) or boron nitride (BN);

class 2: solid bodies owing their lubricating properties to their crystalline structure and also to a reactive chemical element in their composition, for example molybdenum disulphide $MoS_2$, graphite fluoride, tin sulphides, bismuth sulphides, tungsten disulphide, or calcium fluoride;

class 3: solid bodies owing their lubricating properties to their chemical reactivity, for example certain chemical compounds of the thiosulphate type, or Desilube 88® sold by Desilube Technologies Inc;

class 4: solid bodies owing their lubricating properties to a plastic or viscoplastic behaviour under frictional stress, for example polytetrafluoroethylene (PTFE) or polyamides.

TABLE 8

| Product name | Chemical nature | Ref (%) | Spec A (%) | Spec B (%) | Spec C (%) |
|---|---|---|---|---|---|
| Thermelt 200 | Pure copolyamide resin (Tg = −26° C.) | 72 | 67.5 | 67.5 | 67.5 |
| Waxso N | Ethylene bis-stearamide | 8 | 7.5 | 7.5 | 7.5 |
| Rhodorsil 47V100 | PDMS (100 mm²/s at 25° C.) | — | 5 | | |
| Rhodorsil 47V1000 | PDMS (1000 mm²/s at 25° C.) | — | | 5 | |
| Wacker AK 12500 | PDMS (12500 mm²/s at 25° C.) | — | | | 5 |
| Shieldex AC5 | Amorphous silica calcium ion exchanger | 10 | 10 | 10 | 10 |
| Carbofluor 3000 | Carbon fluoride | 8 | 8 | 8 | 8 |
| Timrex KS4 | Synthetic graphite | 2 | 2 | 2 | 2 |

TABLE 9

| Product name | Chemical nature | Ref (%) | Spec A (%) | Spec B (%) | Spec C (%) |
|---|---|---|---|---|---|
| Thermelt 200 | Pure copolyamide resin (Tg = −26° C.) | 90 | 81 | 72 | 67.5 |
| Waxso N | Ethylene bis-stearamide | 10 | 9 | 8 | 7.5 |
| Wacker AK 12500 | PDMS (12500 mm²/s at 25° C.) | — | — | — | 5 |
| Shieldex AC5 | Amorphous silica calcium ion exchanger | — | 10 | 10 | 10 |
| Carbofluor 3000 | Carbon fluoride | — | — | 8 | 8 |
| Timrex KS4 | Synthetic graphite | — | — | 2 | 2 |

FIG. 7 shows that the coefficient of friction is preferentially reduced by the silicone oils, especially in the case of low loads (at the start) and as a function of viscosity.

FIG. 8 shows that the coefficient of friction on startup is preferentially reduced by the silicone oil, in contrast to lamellar solid lubricants from class 1 and 2 with cleavage properties under low shear. Even though the phenomenon is attenuated under high loads, the synergy between the silicone oil and the solid lubricants means that the range of loads can be extended.

Adding a migrating silicone oil into the viscoelastic thermoplastic matrixes solves the problem of a high shouldering torque and provides a torque on shoulder resistance value at least equivalent to the reference value for the API RP 5A3 grease.

In order to confirm the hypotheses observed in the laboratory on carbon steel specimens with an electrolytic Cu—Sn—Zn deposit, makeups were carried out using a 7" 29# L80 VAM TOP HC connection.

The influence of viscosity, and as a result molecular mass, of the migrating silicone oil on the value of the shouldering torque was studied.

The same lubricating system was retained for all of the formulations, namely a synergistic effect between class 2-1 solid lubricants. Only the constituents of the thermoplastic matrix were varied.

The selected reference was derived from patent WO 2010/043316 concerning the notion of rheoresistant thermoplastic matrix. This meant that the invention could be compared with a solution having a torque on shoulder resistance value of more than 100% of the reference value for the API RP 5A3 grease.

TABLE 10

| Product name | Chemical nature | Ref (%) | Spec A (%) | Spec B (%) | Spec C (%) | Spec D (%) |
|---|---|---|---|---|---|---|
| Thermelt 100 | Pure copolyamide resin (Tg = +23° C.) | | | 75 | | |
| Thermelt 200 | Pure copolyamide resin (Tg = −26° C.) | | 67.5 | | 67.5 | 67.5 |
| Dertolyne P2L | Colophane ester resin (Tg = +50° C.) | 32 | | | | |
| Ligastab Zn70 | Zinc di-stearate | 15 | | | | |
| Viscoplex 6-950 | Poly(alkyl(meth)acrylate) | 8 | | | | |
| Waxso N | Ethylene bis-stearamide | | 7.5 | | 7.5 | |
| Crodamide EBS | Ethylene bis-stearamide | | | | | 7.5 |
| Rhodorsil 47V1000 | PDMS (1000 mm²/s at 25° C.) | | 5 | 5 | — | — |
| Wacker AK 12500 | PDMS (12500 mm²/s at 25° C.) | | — | — | 5 | 5 |
| Shieldex AC5 | Amorphous silica calcium ion exchanger | | 10 | 10 | 10 | 10 |
| Halox | Strontium calcium zinc | 30 | | | | |

TABLE 10-continued

| Product name | Chemical nature | Ref (%) | Spec A (%) | Spec B (%) | Spec C (%) | Spec D (%) |
|---|---|---|---|---|---|---|
| SZP391 | orthophosphosilicate, hydrated | | | | | |
| Carbofluor 3000 | Carbon fluoride | 7 | 8 | 8 | 8 | 8 |
| Timrex KS4 | Synthetic graphite | | 2 | 2 | 2 | 2 |
| Bi2O3 | Bismuth trioxide | 5 | | | | |
| Nanolub ® | WS2 fullerenes | 3 | | | | |

TABLE 11

| Product name | Number of makeups without galling | Ratio of $1^{st}$ shouldering torque to makeup torque | Number of makeups with shouldering torque < 70% of makeup torque | Ratio of torque on shoulder resistance to reference value for API grease |
|---|---|---|---|---|
| Reference | 4 | 73% | 0 | 111% |
| Specimen A | 15 | 50% | 5 | 143% |
| Specimen B | 11 minimum* | 49% | 1 | No data |
| Specimen C | 10 minimum* | No shouldering (101% of second shouldering) | 0 | 92% |
| Specimen D | 6 | 121% | 0 | No data |

A shouldering torque of less than 70% of the optimum makeup torque was obtained while maintaining the torque on shoulder resistance at 100% or more of the reference value (API RP 5A3 grease) by means of a composition comprising a thermoplastic matrix comprising in the range 10% to 25% by weight of at least one rheoresistant material, at least one pigment type corrosion inhibitor and at least one class 2 solid lubricant such as carbon fluoride. Ion exchange silicas were used as the corrosion inhibitors.

Regarding the makeups carried out, it is clear that incorporating a polydimethylsiloxane type oil into the matrix of the type defined above allows the metal/metal surfaces to be better separated when under friction, thereby reducing the value of the shouldering torque, and guaranteeing a higher resistance to galling by a synergistic effect with the lubricating properties of the solids.

There is clearly a correlation between the migration kinetics of cooling of the migrating oil as a function of the viscosity and the reduction in the value of the coefficient of friction and viscosity of the polydimethylsiloxane type oil. According to Table 11, with the lowest viscosity polydimethylsiloxane type oil, the value of the shouldering torque systematically has values close to 50%.

It proves to be advantageous to incorporate a polydimethylsiloxane type oil with a kinematic viscosity of 1000 $mm^2/s$ or less and with a molecular mass in the range 10000 to 40000 g/mol in order to provide a low shouldering torque value into a thermoplastic matrix comprising at least one rheoresistant material, preferably in the majority as regards quantity.

The Applicant has also established that the migrating waxes and the polydimethylsiloxane type oils also provide good resistance to penetration of water by capillary action and very good permeability to water vapour. It is proposed that these waterproofing properties be exploited in order to strengthen the resistance to water of hot melt thermoplastic matrixes or aqueous phase thermoset matrixes.

The waterproofing properties are demonstrated by measuring the contact angles which themselves provide a measure of the ability of a liquid to be spread over a surface by wetting. The method consists of measuring the angle of the tangent of the profile of a droplet deposited on the substrate to the surface of the substrate in question.

The contact angle measurement can provide access to the surface free energy. It also allows the polar or apolar nature of the interactions at the liquid-solid interface to be distinguished. It is thus possible to deduce the hydrophilic or hydrophobic nature of a surface.

The contact angle is measured by the drop deposition method using a KRUSS DSA 100 type goniometer and from images captured by a camera and stored in a computer, as can be seen in FIG. 6. Software can be used to digitize the contour of the drop by image processing. It then determines the contact angle using interpolation methods.

Tables 12 and 13 show that the contact angle is greatly influenced by adding paraffin wax or polydimethylsiloxane type oil independently of the viscosity, irrespective of the matrix used (hot melt for Table 12 and aqueous phase thermoset for Table 13).

TABLE 12

| Product name | Chemical nature | Ref (%) | Spec A (%) | Spec B (%) |
|---|---|---|---|---|
| Thermelt 200 | Pure copolyamide resin (Tg = −26° C.) | 72 | 67.5 | 67.5 |
| Waxso N | Ethylene bis-stearamide | 8 | 7.5 | 7.5 |
| Rhodorsil 47V1000 | PDMS (1000 $mm^2/s$ at 25° C.) | — | 5 | — |
| Wacker AK 12500 | PDMS (12500 $mm^2/s$ at 25° C.) | — | — | 5 |
| Shieldex AC5 | Amorphous silica calcium ion exchanger | 10 | 10 | 10 |
| Carbofluor 3000 | Carbon fluoride | 8 | 8 | 8 |
| Timrex KS4 | Synthetic graphite | 2 | 2 | 2 |
| Kruss DSA 100 goniometer | Contact angle θ: | 89.6° | 111° | 112.1° |

TABLE 13

| Product name | Chemical nature | Ref (%) | Spec A (%) | Spec B (%) | Spec C (%) | Spec D (%) |
|---|---|---|---|---|---|---|
| Lumiflon FD1000 | FEVE dispersion | 87 | 85.5 | 85 | 70 | 68.5 |
| Bayhydur 3100 | Aliphatic polyisocyanate HDI | 13 | 12.5 | 12.5 | 10 | 9.5 |
| Aquabead 325E | Paraffin wax emulsion | — | — | — | — | — |
| Silres BS 1306 | Polydimethyl-siloxane emulsion | — | 2 | 2.5 | — | 2 |
| AustroTec Bis84 | Bismuth trisulphide | — | — | — | 14 | 13.5 |
| Xeon F4 | Poly-tetrafluoroethylene (D50 = 1 μm) | — | — | — | 4 | 4 |
| Boronid SPC1 | Boron nitride | — | — | — | 2 | 2 |
| Pigment/binder ratio | | — | 0.05 | 0.02 | 0.5 | 0.5 |
| Kruss DSA 100 goniometer | Contact angle θ: | 75° | 101° | 108° | 65° | 99° |

The migrating sliding agents in thermoplastic matrixes in aqueous phase or thermoset matrixes in aqueous phase were evaluated. The surface of the specimens was still carbon steel with an electrolytic Cu—Sn—Zn deposit.

As was the case with the thermoplastic hot melt matrixes, the migrating oils offer the possibility of reducing the friction under load without affecting the torque on shoulder resistance torque.

The results are listed in Table 14 for the aqueous phase thermoplastic matrixes and in particular a dispersion of polyester-acrylate copolymers, an emulsion of styrene-acrylic copolymers and a dispersion of fluoroethylenevinylether.

TABLE 14

| Product name | Chemical nature | Ref (%) | Spec A (%) | Ref (%) | Spec B (%) | Ref (%) | Spec C (%) |
|---|---|---|---|---|---|---|---|
| Lumiflon FD1000 | FEVE dispersion | 87 | 85.5 | — | — | — | — |
| Bayhydur 3100 | Aliphatic polyisocyanate HDI | 13 | 12.5 | — | — | — | — |
| Ercrothane 433 | Polyester-acrylate copolymer dispersion | — | — | 100 | 98 | — | — |
| Maincote 1100 | Styrene-acrylic copolymer emulsion | — | — | — | — | 100 | 98 |
| Silres BS 1306 | Polydimethylsiloxane emulsion | — | 2 | — | 2 | — | 2 |
| Scratch test | Mean COF 5-80 N: | 0.074 | 0.05 | 0.155 | 0.067 | 0.224 | 0.043 |
| Scratch test | Mean COF 10-310 N: | 0.09 | 0.075 | 0.16 | 0.107 | 0.264 | 0.095 |

At the same time, a range of useful concentrations for which the film retained its principal properties was to be determined. Table 15 shows the results obtained from the above matrixes. The critical load (Lc) corrosions to the appearance of loss of cohesion of the film.

TABLE 15

| Product name | Chemical nature | Spec A1 (%) | Spec A5 (%) | Spec B1 (%) | Spec B5 (%) | Spec C1 (%) | Spec C5 (%) |
|---|---|---|---|---|---|---|---|
| Lumiflon FD1000 | FEVE dispersion | 86 | 83 | — | — | — | — |
| Bayhydur 3100 | Aliphatic polyisocyanate HDI | 13 | 12 | — | — | — | — |
| Ercrothane 433 | Polyester-acrylate copolymer dispersion | — | — | 99 | 95 | — | — |
| Maincote 1100 | Styrene-acrylic copolymer emulsion | — | — | — | — | 99 | 95 |
| Silres BS 1306 | Polydimethylsiloxane emulsion | 1 | 5 | 1 | 5 | 1 | 5 |
| Scratch test | Mean COF 5-80 N: | 0.086 | 0.052 | 0.148 | 0.039 | 0.089 | 0.041 |
| Scratch test | Mean COF 10-310 N: | 0.11 | 0.102 | 0.156 | 0.121 | 0.146 | 0.105 |
| Scratch test | Critical load, Lc (N) | >310 | 187 | 285 | 157 | 217 | 127 |

A concentration of 2% by weight of the total formulation is advantageous in obtaining a surface friction of less than 0.1 for a contact pressure of the order of 1.1 GPa. This does not affect the adhesion properties of the dry film, in particular on a surface of the non-polar electrolytic Cu—Sn—Zn deposit type.

The use of a functionalized polydimethylsiloxane emulsion, preferably amine-functionalized, reinforces the adhesive properties irrespective of the surface.

Having regard to the series of tests which has been carried out, the Applicant is of the opinion that a very low coefficient of friction, especially at the metal-metal contact of the sealing surfaces during the shouldering phase, may be obtained by using solid lubricants having plastic deformation properties under extreme Hertz stresses and at low speeds. A maximum seal of the connection, especially for high makeup torques, is obtained by providing a sufficiently low coefficient of friction while keeping the torque on shoulder resistance as high as possible.

The present invention can on the one hand produce shouldering torques which are lower than or at most equal to the shouldering torque values obtained with an API grease, and on the other hand can produce ToSR values that are higher than or at least equal to the values obtained with an API grease.

The invention claimed is:

1. A tubular element for drilling and/or working hydrocarbon wells, comprising:
an end portion having at least one threaded zone, wherein the end portion is at least partially coated with a dry film which comprises a matrix and at least one migrating sliding agent in the matrix principally distributed in the vicinity of a free surface of the lubricating dry film, the migrating sliding agent being concentrated to 65% by weight in an upper 15 microns of a thickness of the dry film,
wherein said at least one sliding agent is selected from the group consisting of:
polydimethylsiloxane type silicone oil with a surface tension of less than 24 mN/m and a kinematic viscosity in the range 100 to 1850 $mm^2/s$ at 20° C., and
perfluoropolyether with a kinematic viscosity in the range 150 to 1850 $mm^2/s$ at 20° C. or functionalized alkyl-amide or phosphate with a molecular mass in the range 1850 to 3100 g/mol, such that the dry film has a coefficient of friction of less than 0.07 at loads of less than 40 N and more than 0.1 at loads of more than 200 N.

2. An element according to claim 1, in which said matrix is of the thermoset or thermoplastic type and is selected such that the dry film has a torque on shoulder resistance value at least equal to that obtained with an API RP 5A3 grease.

3. An element according to claim 2, in which said matrix is of the fluoro-urethane type and is obtained by curing fluoroethylenevinylether in aqueous dispersion.

4. An element according to claim 2, wherein said matrix is of the thermoplastic type and is obtained from copolymers of polyester-acrylates or styrene-acrylic copolymers in aqueous dispersion.

5. An element according to claim 2, wherein said matrix is of the thermoplastic hot melt projected type and is selected such that the dry film has a torque on shoulder resistance value at least equal to that obtained with an API RF 5A3 grease.

6. An element according to claim 2, wherein said matrix is of the copolyamide type.

7. An element according to claim 1, wherein the lubricating dry film comprises in the range 5% to 10% by weight of polydimethylsiloxane oil as the sliding agent.

8. An element according to claim 3, wherein the dry film comprises approximately 2% by weight of polydimethylsiloxane oil as the sliding agent.

9. An element according to claim 1, wherein the lubricating dry film comprises particles of lubricants from a class 1, class 2, class 3, or class 4,
wherein class 1 which is defined as solid bodies owing their lubricating properties to their crystalline structure, class 2 is defined as solid bodies owing their lubricating properties to their crystalline structure and also to a reactive chemical elements in their composition, class 3 is defined as solid bodies owing their lubricating properties to their chemical reactivity, and class 4 is defined as solid bodies owing their lubricating properties to a plastic or viscoplastic behavior under frictional stress.

10. An element according to claim 1, wherein the dry film further comprises an anti-corrosion agent.

11. An element according to claim 1, wherein the coated part of the end portion has previously undergone a surface preparation of the type selected from the group formed by sandblasting, conversion treatments, electrolytic deposition and non-reactive treatments.

12. An element according to claim 1, wherein said end portion comprises at least one sealing surface intended for metal/metal contact, and said sealing surface is coated with lubricating dry film.

13. An element according to claim 1 wherein the whole of said threaded zone is coated with dry film.

14. An element according to claim 1 wherein said threaded zone is free of a coating of lubricating dry film.

15. A tubular connection for drilling and/or working hydrocarbon wells, comprising:
at least one tubular element having an end portion,
wherein said end portion is at least partially coated with a dry film which comprises a matrix and at least one migrating sliding agent in the matrix principally distributed in the vicinity of a free surface of the lubricating dry film, the migrating sliding agent being concentrated to 65% by weight in an upper 15 microns of a thickness of the dry film,
wherein said at least one sliding agent is selected from the group consisting of:
polydimethylsiloxane type silicone oil with a surface tension of less than 24 mN/m and a kinematic viscosity in the range 100 to 1850 $mm^2/s$ at 20° C., and
perfluoropolyether with a kinematic viscosity in the range 150 to 1850 $mm^2/s$ at 20° C. or functionalized alkyl-amide or phosphate with a molecular mass in the range 1850 to 3100 g/mol,
such that the dry film has a coefficient of friction of less than 0.07 at loads of less than 40 N and more than 0.1 at loads of more than 200 N.

16. An element according to claim 10, wherein the anti-corrosion agent is an ion exchange silica.

17. An element according to claim 9, wherein the lubricating dry film comprises particles of carbon fluorides and/or synthetic graphites.

* * * * *